United States Patent
Hara et al.

(10) Patent No.: US 6,280,836 B1
(45) Date of Patent: Aug. 28, 2001

(54) MULTILAYER MOLDED ARTICLE

(75) Inventors: Takahisa Hara, Kawanishi; Masahito Matsumoto, Osaka; Hitoshi Nakada, Okayama, all of (JP)

(73) Assignees: Sumitomo Chemical Co., Ltd., Osaka; Suiryo Plastics Co., Ltd., Okayama, both of (JP)

( * ) Notice: Subject to any disclaimer, the term of this patent is extended or adjusted under 35 U.S.C. 154(b) by 0 days.

(21) Appl. No.: 08/267,768

(22) Filed: Jul. 5, 1994

Related U.S. Application Data

(63) Continuation of application No. 07/955,755, filed on Dec. 24, 1992, now abandoned.

(30) Foreign Application Priority Data

Apr. 25, 1991 (JP) .................................................. 3-095265

(51) Int. Cl.$^7$ ...................................................... B32B 3/26
(52) U.S. Cl. .................................. 428/318.8; 428/319.7; 428/319.9
(58) Field of Search ............................. 428/304.4, 318.8, 428/319.7, 319.9

(56) References Cited

U.S. PATENT DOCUMENTS

| | | | |
|---|---|---|---|
| 3,954,537 | * 5/1976 | Alfter et al. ........................ | 428/314.8 |
| 4,543,289 | * 9/1985 | Park ................................. | 428/319.7 X |
| 4,769,278 | * 9/1988 | Kamimura et al. ................... | 428/159 |
| 5,053,179 | * 10/1991 | Masui et al. ........................ | 264/257 |
| 5,154,872 | * 10/1992 | Masui et al. ........................ | 264/266 |

FOREIGN PATENT DOCUMENTS

| | | |
|---|---|---|
| 4030964 | 4/1992 | (DE) . |
| 0466179 | 1/1992 | (EP) . |
| 0480153 | 4/1992 | (EP) . |
| 59-150740 | * 8/1984 | (JP) . |
| 62-297123 | * 12/1987 | (JP) . |
| 63-159022 | * 7/1988 | (JP) . |
| 63-251206 | * 10/1988 | (JP) . |
| 64-22545 | * 1/1989 | (JP) . |
| 64-26414 | * 1/1989 | (JP) . |
| 1-141011 | * 6/1989 | (JP) . |
| 1-235613 | * 9/1989 | (JP) . |

OTHER PUBLICATIONS

Abstract from EPX 333 193, which corresponds to JPX 01–235613; 9/1989.*

English language Abstract for JPX 64–22545; 1/1989.*

* cited by examiner

*Primary Examiner*—Blaine Copenheaver

(57) ABSTRACT

A multilayer molded article is produced using a composite skin layer made of a skin material and a foam sheet on a core layer of a thermoplastic resin in which a tensile modulus E of the skin material is not larger than 950 kg/cm$^2$, and a tensile modulus E (kg/cm$^2$), a heat shrinkage factor F (%) and a thickness t (cm) of the skin material satisfy the following relationship:

$$20/(E \times t) + F \geq 2.5,$$

which method produces a large size multilayer molded article having a complicated shape and no wrinkles, breakage or uneven marks in the skin material on the surface of the article.

4 Claims, 1 Drawing Sheet

MULTILAYER MOLDED ARTICLE

This application is a continuation, of application Ser. No. 07/955,755 filed on Dec. 24, 1992, now abandoned.

FIELD OF THE INVENTION

The present invention relates to a method for producing a multilayer molded article comprising laminating a composite skin layer which has been beforehand formed from a skin material and a foam sheet and a core layer of a thermoplastic resin, and a multilayer molded article produced by this method.

PRIOR ART

A large amount of plastic molded articles are used in various fields including automobiles and domestic electric equipments in view of its economy, free moldability and light weight. With the increase of diversification of the applications, varieties of appearance of the products are required. In particular, in these years, it has been strongly desired to impart a decorative effect and soft feeling to the product. Hitherto, many studies have been made to provide a compound which has functions satisfying such desires. However, it is difficult for a single material to have the above surface properties while maintaining free moldability and strength. At present, a large number of multilayer molded articles in which several materials having different functions are combined are usually used.

Among the multilayer molded articles, a multilayer molded article having a foam layer between the core layer and the skin material is excellent in soft feeling, and various types of such articles are proposed.

Hitherto, as a method for producing such multi-layer molded article, there is proposed as method comprising placing a composite skin layer which comprises a skin material and a foam sheet between molds, supplying a molten resin when the molds are not closed and then closing the molds to obtain the multilayer molded article (see Japanese Patent Kokai Publication No. 235613/1989).

Though the above method is an industrially advantageous method, when it is used to produce an article having a complicated shape such as an instrument panel of an automobile, the skin layer tends to suffer from breakages, wrinkles and debossing.

SUMMARY OF THE INVENTION

An object of the present invention is to solve the above problems of the prior arts and provide a method for producing a multilayer molded article which has a good appearance without breakages, wrinkles or debossing in its skin layer.

As the result of the extensive study to achieve the above object, it has been found that, by the use of a composite skin layer comprising a skin material which has the specific properties before lamination, a multilayer molded article having fairly good appearance is obtained even if the article is a large size one having a complicated shape, and the present invention has been completed. Accordingly, the present invention provides a method for producing a multilayer molded article comprising laminating a composite skin layer which is preformed from a skin material and a foam sheet on a core layer of a thermoplastic resin, characterized in that a tensile modulus E of said skin material of the composite skin layer is not larger than 950 kg/cm$^2$, and a tensile modulus E (kg/cm$^2$), a heat shrinkage factor F (%) and a thickness t (cm) of said skin material satisfy the following relationship (1):

$$20/(E \times t) + F \geq 2.5 \tag{1}$$

DETAILED DESCRIPTION OF THE INVENTION

Figure 1A:
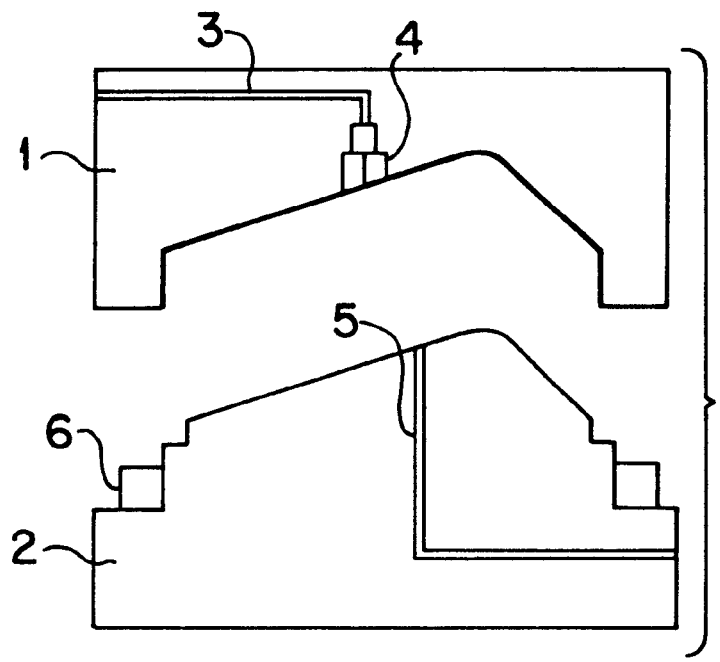
FIGS. 1A to 1C show cross sectional views of the molding apparatus in various steps of the molding method according to the present invention.

The thermoplastic resin to be used as the core layer according to the present invention is not limited and any of those conventionally used in compression molding, injection molding and extrusion molding may be used. Examples of the thermoplastic resin are thermoplastic resins such as polypropylene, polyethylene, polystyrene, acrylonitrile-styrene-butadiene copolymer and polyamide; and thermoplastic elastomers such as ethylene-propylene block copolymer and styrene-butadiene block copolymer. The thermoplastic resin containing an additive such as a filler (e.g. an inorganic filler or glass fibers), a pigment, a lubricant, an antistatic agent, and the like may be used.

As the skin material which forms a part of the composite skin layer used in the present invention, there are exemplified sheets made of a thermoplastic resin (e.g. polyolefin, polyvinyl chloride, polyamide, etc.) and a thermoplastic elastomer (e.g. polyolefin, polyester, polystyrene, etc.). An embossed sheet is preferably used as a leather-like sheet.

As the foam sheet which forms a part of the composite skin layer used in the present invention, there are exemplified foam sheets of polypropylene foam, polyethylene foam, polyurethane foam and the like. A thickness of the foam sheet is preferably from 1.5 to 10 mm. When the thickness of the foam sheet is smaller than 1.5 mm, the cushioning property is insufficient, while when the thickness is larger than 10 mm, the cost performance is disadvantageous. An expansion ratio of the foam sheet is from 3 to 40 times. When the expansion ratio of smaller than 3 times, the cushioning property is insufficient. When the expansion ratio is larger than 40 times, the foam sheet is too soft unpreferably.

In the present invention, the composite skin layer which is preformed from the skin material and the foam sheet is used. For preforming the composite skin layer, the skin material and the foam sheet may be adhered with an adhesive or fusion bonded. For example, in a case where the olefinic thermoplastic elastomer sheet is used as the skin material and the polypropylene foam sheet is used as the foam sheet, when the olefinic thermoplastic elastomer sheet is produced using a T-die, one of a pair of rolls for nip cooling of the sheet form molten elastomer is embossed and the polypropylene foam sheet is supplied between the other roll and the molten elastomer, whereby the composite skin layer which has an embossed surface and is lined with the polypropylene foam sheet is produced in one step.

To produce a multilayer molded article having a complicated form such as an instrument panel, in general, the produced composite skin layer is premolded by conventional thermoforming and used. In this case, preferably, a mold used in the premolding has a shape such that an inner surface shape of a female mold used in the press molding conforms to the outer surface shape of the premolded composite skin layer.

The multilayer molded article of the present invention is produced by positioning the composite skin layer between upper and lower mold, supplying the resin melt between the foam sheet of the composite skin layer and either one of the molds, closing the molds and pressing and cooling the molds. One of the important factors in the present invention is that the composite skin layer comprises the skin material having, before being contacted to the resin melt, the tensile modulus E of not larger than 950 kg/cm$^2$, and the tensile modulus E (kg/cm$^2$), the heat shrinkage factor F (%) and the thickness t (cm) which satisfy the above relationship (1).

The composite skin layer can be prepared by bonding the skin material which satisfies all of the above requirements to the foam sheet, for example, with an adhesive, or laminating a skin material which does not originally satisfy the above requirements on the foam sheet and thermoforming the laminate to impart heat history to the skin material. Among the above preparation methods, in the former one, since it is difficult to purchase a skin material which satisfies all of the above requirements, the properties are adjusted by selecting compositions or components of a usual skin material, or heating the skin material and then cooling down to room temperature, or heating the skin material in an expanded state and then cooling it, or controlling its thickness. However, such methods require the pretreatment of the skin material. Therefore, the latter method, that is, the premolding method comprising laminating the skin material which does not originally satisfy the above requirements on the foam sheet and thermoforming the laminate, is preferred. Needless to say, the skin material which does not satisfy any of the above requirements even after the above pretreatment is not suitable for the production of the multilayer molded article of the present invention.

The tensile modulus of the skin material is measured according to JIS K7113 using a No. 2 test sample at a pulling rate of 200 mm/min. The heat shrinkage factor is calculated from a size change before and after keeping the skin material in an oven at 80° C. for 5 minutes and maintaining it at room temperature for 12 hours. In the case of the skin material which is composited in the premolded composite skin layer, the properties are measured with the skin material after removing the foam sheet.

The multilayer molded article of the present invention is produced by positioning the composite skin layer between unclosed upper and lower mold, supplying the resin melt between the foam sheet of the composite skin layer and either one of the molds, closing the molds and pressing and cooling the molds. In the method of the present invention, to avoid the damage of the composite skin layer, timings of the resin melt supply and the mold closing are important. Preferably, the resin melt is supplied through a resin passage formed in one of the upper and lower molds at a mold closing rate of 30 mm/sec. or less, when a cavity clearance between the upper and lower molds is from (C+5) mm to (C+100) mm in which C is a cavity clearance at the completion of the molding). Thereafter, the molds are closed till the clearance reaches C mm, pressed and cooled for a determined time, whereby the desired multilayer molded article is produced.

EXAMPLES

The present invention will be illustrated by the following Examples, which do not limit the scope of the present invention.

Example 1

Figure 1B:
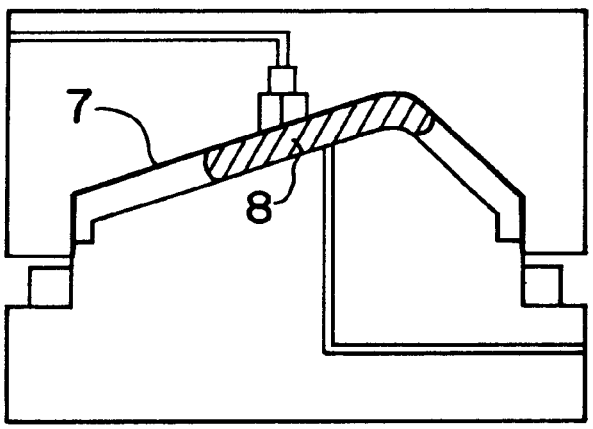
Figure 1C:
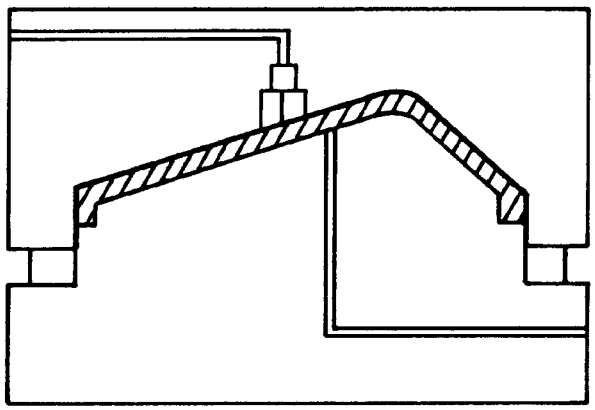

The molding was carried out using a vertical pressing machine having a clamping force of 200 tons to which molds for producing an instrument panel having a length of 1500 mm were attached as shown in FIG. 1.

As the skin material, an embossed polyvinyl chloride sheet having a thickness of 0.7 mm (manufactured by Kyowa Leather Co., Ltd.) was used, and on the skin material, a polypropylene foam sheet having a thickness of 3.0 mm and an expansion ratio of 15 times (PPSM 15030 manufactured by TORAY CO., LTD.) was bonded with an adhesive. Using a far infrared heater, the composite sheet was heated to 160° C. on the skin material surface and 135° C. on the polypropylene foam sheet surface. Then, the lower mold was lifted and the polypropylene foam sheet side of the composite skin layer was sucked onto the lower mold having vacuum suction holes on its surface. The composite skin layer was then cooled with a fan to finish premolding. At this time, the polyvinyl chloride sheet after removing the polypropylene foam sheet had the tensile modulus of 244 kg/cm$^2$ and the heat shrinkage factor of 1.49. This composite skin layer premolded by thermoforming was used.

As a thermoplastic resin, polypropylene (SUMITOMO NOBLEN BP 697 K manufactured by Sumitomo Chemical Co., Ltd.; a melt flow index of 30 g/min.) was used. It was heated and supplied in the molds for molding. The upper and lower molds were heated at 30° C. and 40°0 C., respectively.

The composite skin layer 7 which had been positioned between the upper and lower molds 1 and 2 was sucked on the surface of the upper mold 1 through a vacuum suction hole 3.

The upper mold 1 was lowered at a rate of 200 mm/sec. When the cavity clearance between the upper and lower molds reached 70 mm, the lowering rate of the upper mold 1 was decreased to 6 mm/sec. and simultaneously, the resin melt 6 heated and molten at 200° C. was supplied between the foam sheet side of the composite skin layer 7 and the lower mold 2 through a resin passage 5 which is provided in the lower mold. When the cavity clearance reached 40 mm, the supply of the resin melt was finished. As the upper mold 1 was further lowered, the resin melt 8 flowed between the composite skin layer 7 and the surface of the lower mold and reached the edges of the cavity to fill the mold cavity. The molds were pressed and cooled for 40 seconds and the upper mold 1 was lifted up. The desired molded article was removed to obtain the good appearance multilayer molded article having no wrinkles, breakage or uneven marks on the surface.

Examples 2 and 3

Under the same conditions as in Example 1 except that a polyvinyl chloride sheet shown in Table 1 was used as a skin material, the molding was carried out. As in Example 1, the good appearance multilayer molded article which was covered with the embossed skin material having no wrinkles, breakage or uneven marks was obtained.

Comparative Examples 1, 2 and 3

Under the same conditions as in Example 1 except that a polyvinyl chloride sheet shown in Table 1 was used as a skin material, the molding was carried out. Different from the molded article produced in the above Examples, the poor appearance multilayer molded article having uneven marks and the like was obtained.

TABLE 1

| Example No. | Thickness (mm) | Skin material | | | | 20/ET + F | Surface appearance of the molded article |
| --- | --- | --- | --- | --- | --- | --- | --- |
| | | Raw material | | After premolding | | | |
| | | Tensile modulus (kg/cm$^2$) | Heat shrinkage factor (%) | Tensile modulus (kg/cm$^2$) | Heat shrinkage factor (%) | | |
| 1 | 0.7 | 231 | 0.37 | 244 | 1.49 | 2.66 | 0 |
| 2 | 0.7 | 164 | 0.47 | 160 | 1.23 | 3.02 | 0 |
| 3 | 0.7 | 187 | 0.25 | 140 | 2.30 | 4.34 | 0 |
| C. 1 | 0.7 | 963 | 0.05 | 870 | 0.88 | 1.21 | X |
| C. 2 | 0.7 | 463 | 0.66 | 499 | 0.36 | 0.93 | X |
| C. 3 | 0.7 | 199 | 0.86 | 195 | 0.58 | 2.05 | X |

EFFECTS OF THE INVENTION

According to the present invention, it is possible to produce a multilayer molded article having good appearance and no wrinkles, breakage or uneven marks in the skin material on the molded article surface, even in a case of a large and complicated shaped article.

What is claimed is:

1. A multilayer molded article comprising:

a thermoplastic resin layer; and a composite skin layer, disposed on said thermoplastic resin layer, having a skin material and a foam sheet, characterized in that a tensile modulus E of said skin material of the composite skin layer is not larger than 950 kg/cm$^2$, and a tensile modulus E (kg/cm$^2$), a heat shrinkage factor F (%) and a thickness t (cm) of said skin material which satisfy the following relationship:

$$20/(E \times t) + F \geq 2.5;$$

and laminating said preformed composite skin layer on a core layer of a thermoplastic resin for producing the multi-layered molded article.

2. The multilayer molded article according to claim 1, wherein said article is an instrument panel of an automobile.

3. The multilayer molded article as recited in claim 1, wherein said foam sheet has a thickness in the range of between 1.5 to 10 mm.

4. The multilayer molded article as recited in claim 1, wherein said foam sheet has an expansion ratio in the range of between 3 to 40.

* * * * *